United States Patent [19]

Stevens et al.

[11] Patent Number: 5,455,620
[45] Date of Patent: Oct. 3, 1995

[54] AUTOMATIC GENERATION OF VECTOR REFERENCE GRATICULES

[75] Inventors: Douglas C. Stevens, Portland; James L. Tallman, Beaverton, both of Oreg.

[73] Assignee: Tektronix, Inc., Wilsonville, Oreg.

[21] Appl. No.: 184,156

[22] Filed: Jan. 21, 1994

[51] Int. Cl.⁶ .......................... H04N 17/00; H04N 17/02
[52] U.S. Cl. .......................... 348/184; 348/186; 348/182
[58] Field of Search .................................. 348/186, 184, 348/185, 180–183, 189, 190; 324/88; H04N 17/00, 17/02

[56] References Cited

U.S. PATENT DOCUMENTS

| | | | |
|---|---|---|---|
| 3,850,412 | 11/1974 | Olson | 348/186 |
| 4,758,877 | 7/1988 | Slavin | 348/182 |
| 4,953,017 | 8/1990 | Ivey et al. | 348/185 |
| 5,122,863 | 6/1992 | Zortea | 348/186 |

*Primary Examiner*—James J. Groody
*Assistant Examiner*—Michael H. Lee
*Attorney, Agent, or Firm*—Francis I. Gray

[57] ABSTRACT

A system for automatic generation of vector reference graticules for a vectorscope display acquires the active video portion of a video signal that includes a color bar test signal. The values for each color difference component at each reference color plateau for the acquired color bar test signal are averaged to provide horizontal and vertical displacement values for each reference color, including black. Graticule boxes are electronically generated and positioned for each reference color on a display according to the respective horizontal and vertical displacement values.

6 Claims, 1 Drawing Sheet

AUTOMATIC GENERATION OF VECTOR REFERENCE GRATICULES

BACKGROUND OF THE INVENTION

The present invention relates to television vectorscopes, and more particularly to a system for automatic generation of vector reference graticules for a vectorscope.

A vectorscope display of a color bar signal is a traditional way of verifying the colorimetric accuracy of a video system. One typical application of this display is for camera adjustment. A user directs the camera to be adjusted at an evenly illuminated color bar chart or an image projected from a transparency, and checks the position of each endpoint in the vector display against a reference graticule indicating the theoretically correct positions of the endpoints of the respective color vectors. However several complications occur with this technique.

First, it is difficult to control the illumination on the bar chart or through the transparency so that the intensity of the color difference signals (color vectors) matches that of the reference graticule. Most vectorscopes provide for this by allowing the vertical and horizontal gains of the displayed signal to be adjusted.

Second, even after adjusting for variations in illumination there may be colorimetric errors which cannot be fully corrected. For instance the most commonly used phosphors do not allow accurate rendering of all of the colors in the reference vector graticule. Therefore rather than attempting to accurately match the vector signal from the camera to the graticule, some users attempt to match all of their cameras to a known variance from the graticule. Some measurement instruments, such as the 1760 Series Combination Waveform/Vector Monitors manufactured by Tektronix, Inc. of Wilsonville, Oreg., United States of America, provide a set of adjustable vector graticule boxes. The user displays the vector signal from a reference camera, then individually adjusts the phase and magnitude, or alternatively the vertical and horizontal position, of the boxes to match the tips of the color vectors in the displayed signal. This manual adjustment is slow and somewhat tedious.

SUMMARY OF THE INVENTION

Accordingly the present invention provides a system for automatic generation of vector reference graticules. Upon initiation by an Acquire command the active video portion of an input video signal containing a color bar test signal is stored as digital samples in a memory. Once at least one line of the color bar test signal has been acquired, a microprocessor fetches the sampled representation of the color bar test signal for processing. The microprocessor averages a number of acquired samples around the sample that represents the center of each color represented by the color bar test signal. In this manner the microprocessor, for each of the seven reference colors including black, derives an average value for each of the color difference signals representing the input video signal. These average values are then used to position electronically generated vector graticule boxes which form the reference graticule by adding an offset to the horizontal position of each box which indicates the average value of the blue difference channel for that color, and by adding an offset to the vertical position of each box which indicates the average value of the red difference channel for that color.

The objects, advantages and novel features of the present invention are apparent from the following detailed description when read in conjunction with the appended claims and attached drawing.

DESCRIPTION OF THE PREFERRED EMBODIMENT

Figure 1:
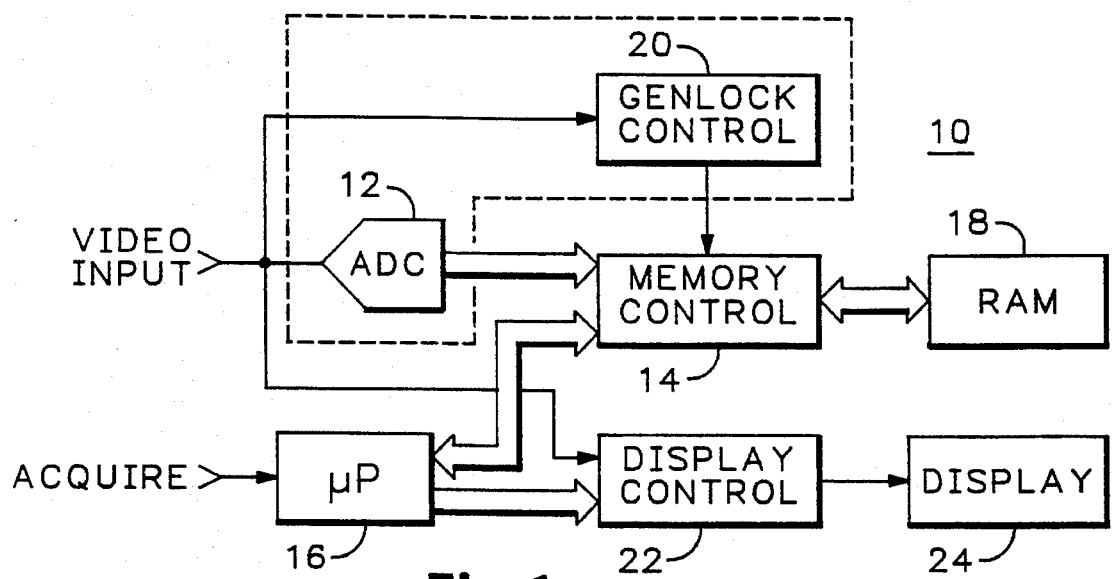
FIG. 1 is a block diagram view of a system for automatic generation of vector reference graticules according to the present invention.

Referring now to FIG. 1 a video signal is input to a vectorscope system 10 for display. If the video signal is in analog form, it is input to an analog-to-digital converter (ADC) 12 where it is converted into digitized samples. The digitized samples are input to a memory controller 14. In response to an Acquire command by a user, such as by pushing a button on the front panel of the vectorscope system 10, a microprocessor 16 enables the memory controller 14 to store the digitized samples in a memory 18, such as a random access memory (RAM). The video signal also is input to a genlock controller 20 that indicates to the memory controller 14 when active video digitized samples are present so that only active video digitized samples are stored in the memory 18. The video signal further is input to a display controller 22 which outputs a signal for display on a display device 24.

Figure 2:
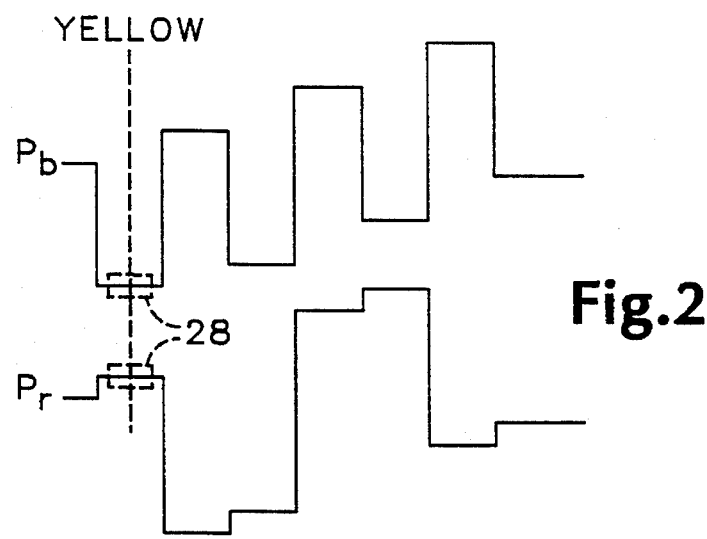
FIG. 2 is a graphic waveform view of the color difference channels for a color bar test signal.

Once acquisition of the video signal is complete, meaning at least one active video line has been stored in the memory 18, the microprocessor 16 requests the memory controller 14 to retrieve the digitized samples from the memory 18 for processing by the microprocessor. The digitized samples represent two color difference signals from the video signal, as shown in FIG. 2—a blue color difference signal Pb and a red color difference signal Pr. The color bar signal has a series of plateaus for each of seven reference colors, including black. The reference colors are yellow, cyan, green, magenta, red and blue. For each reference color the microprocessor 16 averages the values surrounding the midpoint of each plateau to obtain an average value of each color difference signal for each reference color, as indicated for the Yellow bar by the dotted line boxes 28.

Figure 3:
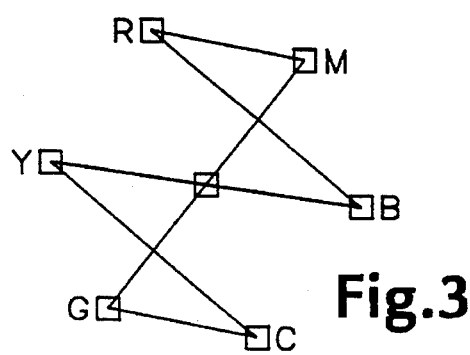
FIG. 3 is a graphic view of a vectorscope graticule according to the present invention.

These averaged values for each reference color are used to position electronic graticule boxes which form a vector display graticule, as shown in FIG. 3. The average values of Pb and Pr for the black reference level define a central location of the display. The differences between the Pb and Pr average values for each reference color and black are used as position offsets for the graticule boxes for each color. The horizontal position is determined by the average Pb value for the specific color and the vertical position is determined by the average Pr value for the same color. The electronic generation of graticules and their positioning are commonly known techniques. The resulting vector display graticule automatically is adjusted for inherent colorimetric errors.

The average values for each reference color may be improved by averaging not only samples about the center of each plateau, but by averaging for the same plateau over several video lines or over several video frames. The averaging process reduces error in the resulting position of the boxes by reducing the contribution of noise, such as 60 Hz hum, to the averaged value. Further if the video signal is already digitized, such as being a parallel or serial 4:2:2 signal where the luminance and color difference channels are encoded as successive 8-or 10-bit values, the ADC 12 is unnecessary, as is the genlock controller 20. However a block of circuitry is then needed to recover the horizontal and vertical framing information from the digital stream to indicate to the memory controller 14 when active video is occurring so only the active video is stored in the memory 18.

Thus the present invention provides a system for automatic generation of vector reference graticules by acquiring a digitized representation of a color bar test signal, averaging about a central point for each reference color of the color bar test signal to produce horizontal and vertical offsets for each reference color, and then electronically generating graticule boxes for each reference color having a position determined by the respective horizontal and vertical offsets.

What is claimed is:

1. A system for automatic generation of vector reference graticules comprising:

means for acquiring an active video portion of an input video signal having a color bar test signal;

means for averaging levels of the acquired active video portion representing horizontal and vertical displacement values for each reference color in the color bar test signal; and means for generating graticule boxes for display for each reference color, the position of the graticule boxes on the display being a function of the respective averaged levels.

2. The system as recited in claim 1 wherein the acquiring means comprises:

means for digitizing the input video signal to produce a digitized signal;

means for determining from the input video signal a control signal that defines the active video portion; and means for storing a portion of the digitized signal corresponding to the active video portion as defined by the control signal, the digitized signal portion being used in the averaging step.

3. The system as recited in claim 2 wherein the averaging means comprises:

means for retrieving the digitized signal portion from the storing means; and means for averaging values on a level of the digitized signal portion corresponding to a specified color to produce the horizontal and vertical offset values for the graticule box for the specified color.

4. The system as recited in claim 1 wherein the acquiring means comprises:

means for determining from the input video signal the active video portion, the input video signal being a digital video signal; and means for storing active video portion of the digital video signal.

5. The system as recited in claim 4 wherein the averaging means comprises:

means for retrieving the active video portion from the storing means; and means for averaging values on a level of the active video portion corresponding to a specified color to produce the horizontal and vertical offset values for the graticule box for the specified color.

6. A method of automatic generation of vector reference graticules comprising the steps of:

acquiring an active video portion of an input video signal having a color bar test signal;

averaging levels of the acquired active video portion representing horizontal and vertical displacement values for each reference color in the color bar test signal; and generating graticule boxes for display for each reference color, the position of the graticule boxes on the display being a function of the respective averaged levels.

* * * * *